(12) United States Patent
Kalwa et al.

(10) Patent No.: US 12,296,499 B2
(45) Date of Patent: May 13, 2025

(54) METHOD FOR PRODUCING A VENEERED BOARD

(71) Applicant: Flooring Technologies Ltd., Kalkara (MT)

(72) Inventors: Norbert Kalwa, Horn—Bad Meinberg (DE); Jens Siems, Malchin (DE)

(73) Assignee: FLOORING TECHNOLOGIES LTD., Kalkara (MT)

( * ) Notice: Subject to any disclaimer, the term of this patent is extended or adjusted under 35 U.S.C. 154(b) by 0 days.

(21) Appl. No.: 17/776,252

(22) PCT Filed: Nov. 5, 2020

(86) PCT No.: PCT/EP2020/081194
§ 371 (c)(1),
(2) Date: May 12, 2022

(87) PCT Pub. No.: WO2021/094198
PCT Pub. Date: May 20, 2021

(65) Prior Publication Data
US 2022/0388197 A1    Dec. 8, 2022

(30) Foreign Application Priority Data
Nov. 12, 2019  (EP) ..................... 19208674

(51) Int. Cl.
*B27D 1/04*     (2006.01)
*B32B 3/16*     (2006.01)
(Continued)

(52) U.S. Cl.
CPC .................. *B27D 1/04* (2013.01); *E04C 2/12* (2013.01); *E04C 2/24* (2013.01)

(58) Field of Classification Search
USPC ................ 156/307.1, 307.5, 307.7, 313, 180
See application file for complete search history.

(56) References Cited

U.S. PATENT DOCUMENTS 2,428,654 A * 10/1947 Collins ................... B29C 70/00
                                                    273/DIG. 7
2,757,711 A *  8/1956 Petry ...................... B32B 27/00
                                                    156/320
(Continued)

FOREIGN PATENT DOCUMENTS

CN       102086616 A      6/2011
CN       107848326 A      3/2018
(Continued)

OTHER PUBLICATIONS

English machine translation of EP-2902196-A1; Norbert; Aug. 5, 2015; B32B21/042 CPC; 21 pages. (Year: 2015).*
(Continued)

*Primary Examiner* — Linda L Gray
(74) *Attorney, Agent, or Firm* — Bachman & LaPointe, P.C.

(57) ABSTRACT

A method for producing a veneered board having a veneer and a carrier board having improved use properties includes the steps of providing a veneer and a carrier board, providing a sheet of paper impregnated with binder, the sheet of paper being arranged in a stack of materials to be pressed between an upper face of the carrier board and a lower face of the veneer, and pressing the stack of materials to be pressed. The sheet of paper is impregnated with a binder, the sheet of paper impregnated with binder is pre-dried so that it is still sticky, at least one additive is applied onto the pre-dried, still sticky binder, and the sheet of paper which is impregnated with binder and provided with an additive is dried to a residual moisture content of up to 8%.

6 Claims, 1 Drawing Sheet

(51) Int. Cl.
    *B32B 21/06*     (2006.01)
    *B32B 21/14*     (2006.01)
    *B32B 37/10*     (2006.01)
    *E04C 2/10*     (2006.01)
    *E04C 2/12*     (2006.01)
    *E04C 2/24*     (2006.01)

(56) References Cited

U.S. PATENT DOCUMENTS

| | | | | |
|---|---|---|---|---|
| 3,677,868 | A * | 7/1972 | Boggs | B27D 1/00 52/309.3 |
| 10,981,370 | B2 | 4/2021 | Kalwa | |
| 2014/0199558 | A1 * | 7/2014 | Pervan | B32B 37/18 428/530 |
| 2016/0375674 | A1 | 12/2016 | Schulte | |
| 2018/0194123 | A1 | 7/2018 | Kalwa | |

FOREIGN PATENT DOCUMENTS

| | | |
|---|---|---|
| DE | 2553906 A1 | 8/1976 |
| DE | 10300247 B4 | 11/2006 |
| DE | 102013113130 A1 | 6/2015 |
| EP | 2065183 A1 | 6/2009 |
| EP | 2902196 A1 | 8/2015 |
| WO | 2020211989 A1 | 10/2020 |

OTHER PUBLICATIONS

English machine translation of WO 2020211989 A1; Braun; 16 pages; Oct. 22, 2020; C08L79/02. (Year: 2020).*
English machine translation of CN 205171910 U; Yu; 14 pages; Apr. 20, 2016. (Year: 2016).*
International search report for patent application No. PCT/EP2020/081194 dated Jan. 27, 2021, 5 pages.

* cited by examiner

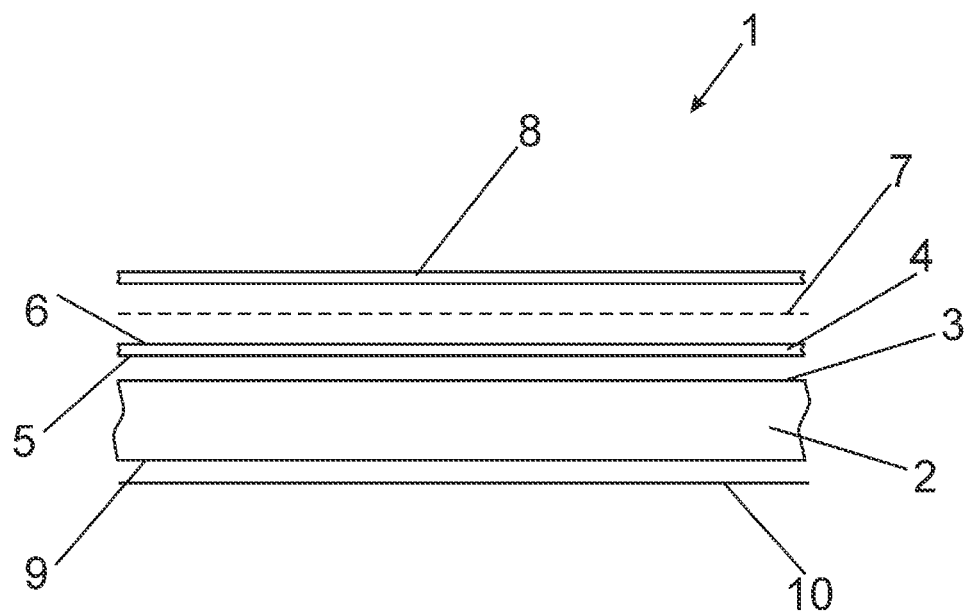

METHOD FOR PRODUCING A VENEERED BOARD

BACKGROUND OF THE INVENTION

The invention relates to a method for producing a veneered board and to the veneered board.

Veneered boards give the impression of a real wood surface, but are very economical on account of the sparing use of thin veneer layers in conjunction with a carrier board. A typical veneered board, in which the veneer is fixed on the carrier board by means of a sheet of paper impregnated with synthetic resin, is presented in EP 2 902 196 A1 and DE 103 00 247 B4 as well.

Furthermore, DE 10 2013 113 130 A1 describes a process for the production of a floorboard consisting of a carrier panel and a veneer applied to the upper face, e.g. by means of a resin paper. The resin can be thickened with a filler. A backing layer is applied to the lower face of the carrier board.

The disadvantage of the known veneered boards is that the properties of the veneer can only be improved to a very limited extent.

The object of the invention is therefore to provide a method for producing a veneered board that makes it possible to improve the properties of the veneer more easily.

SUMMARY OF THE INVENTION

This object is achieved with a method as disclosed herein as well as with a veneered board also as disclosed herein.

The invention relates to a method for producing a veneered board having a veneer and a carrier board, comprising the steps of:
  providing a veneer and a carrier board,
  providing a sheet of paper impregnated with synthetic resin, said sheet of paper being arranged in a stack of materials to be pressed between an upper face of the carrier board and a lower face of the veneer, and
  pressing the stack of materials to be pressed, characterized in that
  the sheet of paper is impregnated with an impregnating resin,
  the sheet of paper impregnated with impregnating resin is pre-dried so that it is still sticky
  at least one additive is applied onto the pre-dried, still sticky synthetic resin, and
  the sheet of paper which is impregnated with synthetic resin and provided with an additive is dried to a residual moisture content of up to 8%.

Any board that is flat on at least one side and that enters a permanent connection with a synthetic resin may be used as the carrier board. Preferably, wood composite boards are used, e.g. medium-density or high-density fiberboards (MDF, HDF), chipboards, OSB boards, solid wood boards, plywood, blockboards or laminboards, but cement-bonded chipboards or fiberboards, including fiberboards with a high content of binder, as well as biocomposite boards and water-resistant boards are also suitable. Water-resistant boards are boards, also wood composite boards, that hardly deform or do not deform at all under the influence of water and that, in particular, do not swell or hardly swell. The carrier board has an upper face, on which the veneer is applied, and a lower face, on which a backing is optionally applied.

Sheets of real wood that have a thickness of up to 10 mm, preferably, however, 0.2 mm to 5 mm, in particular 0.5 mm to 2 mm, are used as veneer. The veneer may be produced in one piece from a log by means of slicing or peeling. However, it may also be composed of individual pieces that, for example, are interconnected by means of binder or so-called glue threads. The veneer preferably has the dimensions of the carrier board. The veneer comprises a lower face facing the carrier board and an upper face facing away from the carrier board.

The sheet of paper preferably consists of cellulose and has a sheet weight of 18 $g/m^2$ to 50 $g/m^2$. It may contain pigments or respectively dyes and binders.

The binder is preferably a thermosetting resin, in particular an aminoplastic or phenol-based resin. In the following, the binder is also referred to as synthetic resin. Typically, melamine resin, phenol resin, urea resin or mixtures of said resins are used. For the impregnation, synthetic resin is used as an aqueous solution with a solids content of approx. 50 wt. % to 60 wt. %, wherein the solids content is equal to the content of synthetic resin. The synthetic resin is applied in an amount of 250% to 600% solids content, relative to the weight per unit area of the paper. The synthetic resin is used in an amount that ensures that the synthetic resin penetrates the veneer at least in sections and, as a result, the additive is transported into the veneer, potentially to the upper face of the veneer. The paper is unrolled from an unwinding station as a rolled good, drawn through an impregnation bath of liquid synthetic resin, and impregnated. Subsequently, the paper impregnated with synthetic resin is dried in a float drier and rolled up or formatted. However, it is also possible for some of the synthetic resin to be used as a solid, for example as powder or dust, for example sprayed on using Tribo pistols. For example, a first portion of the synthetic resin may be applied in liquid form and a second portion of the synthetic resin may be applied in solid form.

The carrier board, the sheet of paper impregnated with synthetic resin and the veneer are layered into a stack of materials to be pressed, wherein a lower face of the sheet of paper impregnated with synthetic resin lies on an upper face of the carrier board and a lower face of the veneer lies on an upper face of the sheet of paper impregnated with synthetic resin.

Optionally, a backing may be arranged on the lower face of the carrier board. The backing is intended to compensate for the tensile forces that are caused by the shrinkage of the synthetic resin in the sheet of paper impregnated with synthetic resin on the upper face of the carrier board during curing of the synthetic resin in the press. The backing is generally a sheet of paper or paperboard impregnated with synthetic resin, but it could also be a veneer or another planar layer that is bonded to the lower face of the carrier board in a planar manner. Preferably, a backing that is similar or comparable to the layer on the upper face of the carrier board is used. Advantageously, a sheet of paper impregnated with synthetic resin and covered with a veneer on the side facing away from the carrier board is therefore used in connection with the invention.

The sheet of paper impregnated with synthetic resin or the impregnate, which is used for the backing in order to bond an external veneer to the carrier board, can of course be produced in the same way as the sheet of paper impregnated with synthetic resin used on the upper face of the carrier board and thus also be provided with an additive or additives. The additive or additives may be the same as or different from those in the sheet of paper impregnated with synthetic resin for the upper face of the carrier board. However, the use of other backings instead of the veneer is also possible. For example, decorative impregnates may be used.

They may also be impregnated with the synthetic resins described above and open up the possibility of designing the rear face of the product differently in terms of color. In detail, these may be monochrome or printed impregnates based on decorative paper.

The stack of materials to be pressed is pressed into a veneered board. In the press, the synthetic resin is liquefied under the influence of increased temperature and increased pressure, it chemically cures and solidifies when cooled. The pressing time is typically between 20 seconds and 60 seconds. The pressing temperature is usually between 100° C. and 240° C., preferably between 160° C. and 200° C. The pressing pressure is between 25 N/mm$^2$ and 50 N/mm$^2$. During the pressing process, the liquefied synthetic resin penetrates into the veneer. Unlike the dense surface of the carrier board, the veneer comprises cavities, on the one hand cracks and fissures induced during production but also cavities that are typical for wood, e.g. due to veins that have been cut into. The synthetic resin penetrating into the veneer causes the veneer to become firmly bonded to the sheet of paper impregnated with synthetic resin or, alternatively, to the carrier board.

According to the invention, the sheet of paper impregnated with synthetic resin is pre-dried after impregnation such that it is still sticky. This is usually the case for a content of volatile substances or, alternatively, evaporable substances, which is also referred to as the residual moisture content (VC value), from VC=10% to VC=15%. The VC value is determined as the difference between the starting weight and end weight after drying at 105° C. to a constant weight.

The synthetic resin forms the surface of the sheet of paper impregnated with synthetic resin. Therefore, the surface of the sheet of paper impregnated with synthetic resin is, as described above, sticky after the pre-drying. An additive is then applied onto this sticky surface of the sheet of paper impregnated with synthetic resin. The additive may be applied in liquid form or as a solid, in particular as a particulate solid. The application may be done by means of spraying, sprinkling, pouring, squeegeeing, rolling, scattering or the like. Multiple additives may also be applied in a mixture. Alternatively or in combination, multiple additives may be applied one after the other. Alternatively, the additives may also be applied into the synthetic resin that is not yet pre-dried.

After the additive or, alternatively, additives has or have been applied, the sheet of paper impregnated with synthetic resin is dried further. The sheet of paper impregnated with synthetic resin and provided with an additive is usually ready for use, i.e. ready for use in a stack of materials to be pressed, at a residual moisture content (VC value) of up to 8%, preferably up to 6%, in particular up to 5%.

The sheet of paper impregnated with synthetic resin, provided with an additive and dried so as to be ready for use differs from known sheets of paper impregnated with synthetic resin in that the additive is not distributed in the synthetic resin, but rather is arranged so as to be concentrated where it is required. According to the knowledge of the inventor, the additive, which is preferably intended to improve the use properties of the veneer, is carried or pressed through the veneer at least in sections during the pressing process on the surface of the synthetic resin, such that the additive is distributed in a targeted manner in the veneer. On the one hand, this enables a particularly economical use of the additive. On the other hand, a higher concentration of the additive reaches the veneer or the veneer surface in a targeted manner, so that the effect of the respective additive is better ensured. The method according to the invention has the advantage that desired use properties can be adjusted in a targeted manner, in particular by combining additives. It has also proven advantageous that the method can be implemented with existing devices without additional equipment-related outlay.

Various substances or compounds may be applied onto the synthetic resin as an additive, in each case individually or in a mixture or one after the other. The following are suitable as an additive, for example: a dye, a pigment, an effect pigment, e.g. metal pigments or reflective pigments, flame retardants such as ammonium phosphates or water glass, ink, a UV stabilizer, an infrared absorber, agents for increasing the conductivity, antibacterial agents, hydrophobizing agents, bleaching agents or stain. Of course, any other additives may also be used, depending on the required or desired property. The additive may be present as a solid, preferably as a particulate solid, e.g. as dust or powder, but also as granular material. Alternatively, a liquid or paste-like additive may be used.

According to a development of the invention, the additive is not soluble in the synthetic resin or, alternatively, is not homogeneously soluble in the synthetic resin. In this way, it is ensured that the additive does not mix with the synthetic resin, but rather remains on the surface of the synthetic resin and, as a result, comes into contact as fully as possible with the veneer.

The method according to the invention is further optimized if, after the synthetic resin has been applied, the excess synthetic resin is removed on the lower face of the sheet of paper impregnated with synthetic resin. It can be stripped away as sharply as possible using for example a scraper or squeegee. In this way, the synthetic resin is only used where it is needed: on the upper face of the sheet of paper impregnated with synthetic resin, from where the synthetic resin, on the surface of which an additive was applied after pre-drying, is pressed through the veneer during the pressing process. Another optimization can be achieved by scattering powdered melamine resin onto the upper face of the sheet of paper when impregnating the overlay prior to the drying step. This results in an improved flowing or, respectively, improved flow of the melamine resin and thus in better transportation of the additive through the veneer after the drying step and application of the additive and during the subsequent pressing. With this variant, the extent of the flow of the synthetic resin can be influenced or, respectively, controlled even more precisely. This is relevant, in particular, for the use of thicker veneers or if a closed film of synthetic resin is to be produced on the surface of the veneer. By means of this method, the paper weight of the overlay and the resin thereof can also be varied, if desired. The amount of synthetic resin powder that can be scattered onto the overlay is up to 100 g/m$^2$. Known scattering devices can be used to apply the powdered synthetic resin.

The invention further relates to a veneered board, comprising a carrier board and a veneer arranged above the carrier board, wherein a sheet of paper impregnated with synthetic resin is arranged between an upper face of the carrier board and a lower face of the veneer, characterized in that the veneer is impregnated with synthetic resin, and in that additives are present on the upper face of the synthetic resin in the veneer, wherein one of the following substances or a mixture of two or more of the following substances is used as an additive: dye, pigment, effect pigment, flame retardants, ink, UV stabilizer, infrared absorber, agents for increasing the conductivity, antibacterial agents, hydrophobizing agents, bleaching agents or stain. The additives, which improve the use properties of the veneer, are predominantly found in the veneer. The synthetic resin is substantially free of additive. The synthetic resin is also substantially free of wood flour, wood fibers or other wood particles.

According to one embodiment, the veneered board comprises a backing on the lower face of the carrier board. The backing may be a sheet of paper impregnated with synthetic resin or a sheet of cardboard impregnated with synthetic resin or, alternatively, a sheet of paperboard, but is preferably also in the form of veneer, particularly advantageously veneer that is fixed to the carrier board by means of a sheet of paper which is impregnated in the same way with synthetic resin and onto which additives are applied. The backing is pressed with the carrier board as a component of the stack of materials to be pressed and prevents the veneered board from warping, because approximately equal forces are now acting on both sides of the carrier board.

Any board that has a flat surface may be used as a carrier board. Preferably, the carrier board is a wood composite board or a biocomposite board, as described above.

BRIEF DESCRIPTION OF THE DRAWING

Details of the invention are explained in greater detail below using exemplary embodiments. In the FIGURE:

FIG. 1 a schematic representation of the layers of a carrier board according to the invention is shown.

DETAILED DESCRIPTION

As shown in FIG. 1, the veneered board 1 according to the invention comprises a carrier board 2 and a sheet of paper 4 impregnated with synthetic resin arranged on the upper face 3 of the carrier board 2. The sheet of paper 4 impregnated with synthetic resin comprises a lower face 5 and an upper face 6. The lower face 5 lies on the upper face 3 of the carrier board 2. The upper face 6 comprises synthetic resin. An additive 7 is applied on the upper face 6. A veneer 8 is arranged on the sheet of paper provided with the additive 7 and impregnated with synthetic resin. The carrier board 2 comprises a lower face 9, on which a backing 10 consisting of a sheet of paper impregnated with synthetic resin is arranged.

The carrier board 2, the sheet of paper 3 impregnated with synthetic resin, the additive 7 and the veneer 8 form a stack of materials to be pressed which is then pressed in order to form a veneered board 1. Optionally, the stack of materials to be pressed is supplemented by the backing 10, which then forms the lower face of the veneered board 1.

Exemplary Embodiment 1—Coloring the Surface

| Starting materials: | | |
|---|---|---|
| Veneer for the upper face: | Thickness: | 0.8 mm |
| | Type: | Oak |
| Overlay impregnated with synthetic resin: | Paper weight: | 25 g/m² |
| | Resin application: | 600% |
| | Synthetic resin: | Melamine resin |
| Additive: | 2.7 g liquid digital printing ink/m² black, aqueous, applied by means of spraying | |
| Carrier board: | High-density fiberboard: | HDF |
| | Thickness: | 12 mm |

| -continued | | |
|---|---|---|
| Starting materials: | | |
| Backing: | Sheet of paper impregnated with synthetic resin, with veneer as outer layer | |
| | Paper weight: | 25 g/m² |
| | Resin application: | 600% |
| | (Top turned to the backing veneer) | |
| | Type of veneer: | Birch |
| | Thickness: | 0.8 mm |

Producing the Sheet of Paper Impregnated with Synthetic Resin

The sheet of paper (overlay) is guided through an impregnation bath with liquid synthetic resin, in this case melamine resin. After impregnation, excess synthetic resin is removed by means of a scraper such that only a layer of synthetic resin sits on the upper face of the sheet of paper, which is now impregnated with synthetic resin. The upper face of the sheet of paper impregnated with synthetic resin consists of synthetic resin, in this case melamine resin.

The sheet of paper impregnated in this manner is subjected to intermediate drying to a VC value of at most 15%, preferably 12%, preferably 10%. In this state, the synthetic resin is sticky. An additive is applied onto the sticky surface of the sheet of paper impregnated with synthetic resin. In the present exemplary embodiment, 2.7 g/m² of aqueous digital printing ink is sprayed on, e.g. by means of an ink jet printer or by means of another spraying device. The additive adheres to the sticky surface of the synthetic resin.

The sheet of resin-impregnates paper thus provided with an additive is then dried further to a moisture content (VC value) of 6%. The intermediate drying and drying take place in known drying devices, e.g. in a tunnel drier, in which hot air nozzles blast the sheet of paper from the top and bottom and thus dry same. The dried sheet of paper impregnated with synthetic resin and provided with an additive can now be stored until it is used.

The sheet of paper impregnated with synthetic resin (overlay) for the backing can be produced in the same way as described above. It can therefore be produced without or with an additive. The additive or the combination of additives may be the same as or different from the sheet of paper impregnated with synthetic resin placed onto the upper face of the carrier board. The sheet of paper impregnated with synthetic resin for the backing is also dried to a VC value of 6%. In exemplary embodiment 1, the backing consists of the sheet of paper impregnated with synthetic resin, with or without additive, and of a veneer, usually an inexpensive veneer that forms the outer layer on the lower face of the veneered board.

Producing the Veneered Board

The backing, carrier board, sheet of paper impregnated with synthetic resin and having an additive, and the veneer are layered in order to form a stack of materials to be pressed.

The stack of materials to be pressed is introduced into an SC press (short-cycle press), where it is pressed at a temperature of 180° C. and a pressure of p=30 N/mm² for a pressing time of 30 seconds. It can be pressed with a simple, smooth press plate. However, in this embodiment, textured press plates may also be used to provide texture. For example, a press plate with a wood texture may be used. After the pressing, black color seepage could be observed in the pores of the veneer and in the veneer flaws (knotholes, etc.). The wood texture of the press plate was visible in the veneer. No visible layer of melamine resin had formed on the upper face of the veneer. Visible discoloration was solely produced by the additive, in this case the black ink. The black ink was therefore conveyed through larger openings in the veneer or, respectively between the fibers of the veneer to the surface of the veneer by means of the liquefying synthetic resin during the pressing process. The veneer surface has therefore been accentuated or respectively designed in a manner that was not possible previously. The method according to the invention offers better design properties and thus use property for a veneered board.

This method can be controlled by scattering melamine resin powder onto the resin that has yet to be dried. In order to illustrate the principle, a defined amount of melamine resin powder was applied onto the overlay impregnated with synthetic resin but yet to be dried, and then dried, and then different amounts of the above-described, diluted digital printing ink were applied. For comparison, an overlay without melamine resin powder scattered on was produced as well in each case. The overlays were then pressed under the same conditions and with the same structure as described in exemplary embodiment 1. As can be seen in the table, the distribution/penetration of the additive can be controlled using this approach.

According to an alternative, within the scope of exemplary embodiment 1, some of the synthetic resin may be applied in solid form, in particular as a powder. A typical sequence for applying synthetic resin may, for example, be that the sheet of paper is firstly impregnated with liquid synthetic resin and then synthetic resin is applied as a powder. After the synthetic resin has been fully applied, the method is continued as described above.

| No. | Melamine powder application in g/m² | Color application diluted fl./m² | Dilution Color: Water | Color application undiluted in g/m² | Assessment |
|---|---|---|---|---|---|
| 1 | 0 | 40 | 1:15 | 2.7 | Slight color seepage into pore |
| 2 | 36 | 39 | 1:15 | 2.6 | More significant color seepage into pore |
| 3 | 0 | 49 | 1:5 | 9.8 | Significant color seepage into pore |
| 4 | 36 | 51 | 1:5 | 10.2 | Very significant color seepage into pore |
| 5 | 0 | 77 | 1:5 | 15.4 | Very significant color seepage into pore |
| 6 | 36 | 75 | 1:5 | 15 | Very significant color seepage into pore, slight color seepage into surface |

Exemplary Embodiment 2—Increasing the Conductivity

| Starting materials: | | |
|---|---|---|
| Veneer for the upper face: | Thickness: | 0.8 mm |
| | Type: | Oak |
| Overlay impregnated with synthetic resin: | Paper weight: | 25 g/m² |
| | Resin application: | 600% |
| | Synthetic resin: | Melamine resin |
| Additive: | Aquacyl AQ 0302 (3%) | 30 g/m² |
| | Applied by means of spraying (*1) (2*) | |
| Carrier board: | High-density fiberboard: | HDF |
| | Thickness: | 12 mm |
| Backing (overlay): | Paper weight: | 25 g/m² |
| | Resin application: | 600% |
| | (Top turned to the backing veneer) | |
| Veneer for the backing: | Thickness: | 0.8 mm |
| | Type: | Birch |

(*1) The product Aquacyl AQ 0302 is an aqueous dispersion of multi-wall carbon nanotubes.
(2*) When used in the context of this text, "%" without further addition refers to % by weight.

The sheet of paper impregnated with synthetic resin is produced as described above for exemplary embodiment 1. However, an aqueous, 3% dispersion of multi-wall carbon nanotubes is sprayed on as the additive, for example by means of a nozzle arrangement that extends across the width of the carrier board.

The backing is also produced as described for exemplary embodiment 1. The carrier board, the sheet of paper impregnated with synthetic resin and the oak veneer are layered onto the backing in order to form a stack of materials to be pressed. Said stack of materials to be pressed is pressed in an SC press at a temperature of 180° C. and a pressure of $p=30$ N/mm² for a pressing time of 30 seconds.

For comparison, a board with otherwise the same structure and production was produced without the additive Aquacyl AQ0302 on the sheet of paper impregnated with synthetic resin.

In this exemplary embodiment, a press plate with an embossed wood texture was also used to provide texture. The wood texture of the press plate was visible in a negative way in the veneer. No layer of melamine resin that would have been apparent due to a dark discoloration of the veneer was visible on the upper face of the veneer. After the veneered board had cooled, in both specimens with and without additive, the surface resistance was determined in accordance with DIN EN 1081:2018 following climatization (48 h, 23° C., 50% relative air humidity). A value of $3\times10^{11}\Omega$ was determined for the sample without Aquacyl AQ 0302. For the sample with the additive, $5\times10^{8}\Omega$ was measured.

Additionally, for the sample with the additive, approx. 0.2 mm of the veneer surface was additionally sanded off using a belt sander in another sample. A repeat measurement of the surface resistance produced $5.5\times10^{8}\Omega$. The surface resistance can therefore be reduced by approx. three powers of ten compared with the control sample by using Aquacyl AQ 0302 with carbon nanotubes. The conductivity of the veneered upper face of the veneered board is thus substantially improved, despite making sparing use of the additive, which is conveyed by means of the synthetic resin in a targeted manner through the veneer to the surface of the veneer during the pressing by being applied onto the sticky surface of the synthetic resin.

Exemplary Embodiment 3—Improving the Light-Fastness

| Starting materials: | | |
|---|---|---|
| Veneer for the upper face: | Thickness: | 0.8 mm |
| | Type: | Oak |
| Sheet of paper impregnated | Paper weight: | 25 g/m² |

| Starting materials: | | |
|---|---|---|
| with synthetic resin: | Resin application: | 600% |
| | Synthetic resin: | Melamine resin |
| Additives: | Lignostab 1198 (10% solution) | 1 g/m² |
| | Tinuvin 292 (10% solution) | 1 g/m² |
| | Applied one after the other by means of spraying | |
| Carrier board: | High-density fiberboard: | HDF |
| | Thickness: | 12 mm |
| Backing: | Paper weight: | 25 g/m² |
| | Resin application: | 600% |
| | (Top turned to the backing veneer) | |
| | Veneer: | Birch |
| | Thickness: | 0.8 mm |

The sheet of paper (overlay) impregnated with synthetic resin and the backing (like overlay) were produced in the same manner as described for exemplary embodiment 1. Two additives were applied onto the pre-dried and thus sticky sheet of paper impregnated with synthetic resin one after the other, i.e. a 10% solution of Lignostab and a 10% solution of Tinuvin, each in an amount of 1 g/m².

The stack of materials to be pressed, which, apart from the additives, has the same structure as in the previous exemplary embodiments, is pressed in an SC press at a temperature of 180° C., a pressure of p=30 N/mm² and with a pressing time of 30 seconds.

For comparison, an otherwise identical veneered board without additives (Lignostab 1198 and Tinuvin 292) was produced on the overlay.

A press plate with a wood texture was used to provide texture. The wood texture of the press plate was visible in the veneer of the veneered board. No layer of melamine resin that would have been apparent due to a dark discoloration of the veneer was visible on the upper face of the veneer.

Subsequently, a light-fastness test according to DIN EN ISO 4892-2, 2013-06 (600 h) was performed. The comparison board (control sample) without the two additives was also tested. In the veneered board according to the invention with the additives, the ΔE was <1.5, and in the sample without agent, the ΔE was 4. The veneered board according to the invention is therefore far more stable than a comparison board without additives. In this case, too, it was found that the additives lie on the surface of the liquefied synthetic resin and are conveyed into or, respectively, through the veneer during the pressing.

The three exemplary embodiments mentioned exhibit only a small selection of the possibilities offered by this method. To improve the properties of the veneers used, no intensive surface treatment and no "dip impregnation" is required. The melamine resin penetrating into the veneer serves as a substrate or respectively transport medium for the agents. At the same time, the agent is distributed in the veneer cross-section.

Exemplary Embodiment 4—Veneer on Both Sides of the Carrier Board

| | | |
|---|---|---|
| Veneer for the lower and upper face: | Thickness: | 0.8 mm |
| | Type: | Oak |
| Sheet of paper impregnated with synthetic resin (overlay): | Paper weight: | 25 g/m² |
| | Resin application: | 600% |
| | Synthetic resin: | Melamine resin |
| Carrier board: | High-density fiberboard: | HDF |
| | Thickness: | 6 mm |

In each case, a veneer made of oak is applied onto the upper face of the carrier board and a veneer made of oak is applied onto the lower face of the carrier board. For this purpose, two sheets of paper are provided with synthetic resin in the same way as described for exemplary embodiment 1. An additive is placed on the synthetic resin, which subsequently penetrates into the veneer. In this connection, a dye, a pigment, an effect pigment, e.g. metal pigments or reflective pigments, flame retardants such as boron compounds or water glass, ink, a UV stabilizer, an infrared absorber, agents for increasing the conductivity, antibacterial agents, hydrophobizing agents, bleaching agents or stain may be used as the additive. The additive may be present as a solid, preferably as a particulate solid, e.g. as dust or powder, but also as granular material. Alternatively, a liquid or paste-like additive may be used, which is preferably not soluble in the synthetic resin or, alternatively, is not homogeneously miscible in the synthetic resin. However, the additive may also be soluble in the binder; in this case, the additive may not be completely transported to the surface. It is a question of the dose of the additive. The amount to be used depends on the desired technical or aesthetic effect and can be determined within few experiments.

In this case, the carrier board is a HDF board that is thin compared with the previous exemplary embodiments, with a thickness of 6 mm. Thin carrier boards are particularly suitable for equipping vehicles, e.g. for the interior finishing of driver's cabs, camper vans, motor homes, airplanes or boats, in particular cruise ships.

In principle, other thin boards of sufficient strength may be used as an alternative, e.g. water-resistant boards with minimal swelling and shrinkage, which are also suitable for use in humid spaces such as swimming pools or saunas, but also bathrooms and kitchens, in particular water-resistant MDF boards or fiberboards with a high content of binder. Exemplary embodiments for implementing the invention with water-resistant boards are given below.

Exemplary Embodiment 5—Water-Resistant Board

| Starting materials: | | |
|---|---|---|
| Veneer for the upper face: | Thickness: | 0.8 mm |
| | Type: | Oak |
| Sheet of paper impregnated with synthetic resin: | Paper weight: | 25 g/m² |
| | Resin application: | 600% |
| | Synthetic resin: | Melamine resin |
| Additive: | Black digital printing ink, liquid, aqueous, applied by means of spraying: | 2.7 g/m² |
| Carrier board: | Board consisting of 55 wt. % melamine resin and 45 wt. % wood fibers | |
| | Thickness: | 5.8 mm |
| Backing: | Sheet of paper impregnated with synthetic resin, with veneer as outer layer | |
| | Paper weight: | 25 g/m² |
| | Resin application: | 600% |
| | (Top turned to the backing veneer) | |
| | Type of veneer: | Birch |
| | Thickness: | 0.8 mm |

Producing the Sheet of Paper Impregnated with Synthetic Resin

The sheet of paper is guided through an impregnation bath with liquid synthetic resin, in this case melamine resin. After impregnation, excess synthetic resin is removed by means of a scraper such that only a layer of synthetic resin sits on the upper face of the sheet of paper, which is now impregnated with synthetic resin. The upper face of the sheet of paper impregnated with synthetic resin consists of synthetic resin, in this case melamine resin. The amount of resin applied is 600% relative to the weight of the sheet of paper.

The sheet of paper impregnated in this manner is subjected to intermediate drying to a VC value of at most 15%, preferably 12%, preferably 10%. In this state, the synthetic resin is sticky. An additive is applied onto the sticky surface of the sheet of paper impregnated with synthetic resin. In the present exemplary embodiment, 2.7 g/m$^2$ of aqueous digital printing ink is sprayed on, e.g. by means of an ink jet printer or by means of another spraying device. The additive adheres to the sticky surface of the synthetic resin.

The sheet of paper provided with additive and impregnated with synthetic resin is then dried further to a moisture content (VC value) of 6%. The intermediate drying and drying take place in known drying devices, e.g. in a tunnel drier, in which hot air nozzles blast the sheet of paper from the top and bottom and thus dry same. The dried sheet of paper impregnated with synthetic resin and provided with an additive can now be stored until it is used.

The sheet of paper impregnated with synthetic resin for the backing can be produced in the same way as described above. It can be produced without or with an additive. The additive or the combination of additives may be the same as or different from the sheet of paper impregnated with synthetic resin placed onto the upper face of the carrier board. The sheet of paper impregnated with synthetic resin for the backing is also dried to a VC value of 6%. In exemplary embodiment 6, the backing consists of the sheet of paper impregnated with synthetic resin, with or without additive, and also of a veneer, usually an inexpensive veneer that forms the outer layer on the lower face of the veneered board.

Producing the Veneered Board

The backing, sheet of paper impregnated with synthetic resin, carrier board, sheet of paper impregnated with synthetic resin and having an additive, and the veneer are layered in order to form a stack of materials to be pressed.

The stack of materials to be pressed is introduced into an SC press (short-cycle press), where it is pressed at a temperature of 180° C. and a pressure of p=30 N/mm$^2$ for a pressing time of 30 seconds. It can be pressed with a simple, smooth press plate. However, in this embodiment, textured press plates may also be used to provide texture. For example, a press plate with a wood texture may be used.

After the pressing, black color seepage could be observed in the cracks and pores of the veneer and in the veneer flaws (knotholes, etc.). The wood texture of the press plate was visible in the veneer. No visible layer of melamine resin had formed on the upper face of the veneer. Visible discoloration was solely produced by the additive, in this case the black ink. The black ink was therefore conveyed through larger openings in the veneer or respectively, between the fibers of the veneer to the surface of the veneer by means of the liquefying synthetic resin during the pressing process.

The boards were finished or rather sealed after the pressing process by means of the application of a UV varnish or UV oil in the surface. The amounts applied were based on the desired use class.

The veneer surface has therefore been accentuated or respectively designed in a manner that was not possible previously. The method according to the invention offers better design properties and thus use properties for a veneered board.

Exemplary Embodiment 6

Water-Resistant Board with Digitally Printed Veneer:

| Starting materials | | |
|---|---|---|
| Veneer for the upper face: | Thickness: | 0.8 mm |
| | Type: | Oak, natural, without knotholes |
| Sheet of paper impregnated with synthetic resin: | Paper weight: | 25 g/m$^2$ |
| | Resin application: | 600% |
| | Synthetic resin: | Melamine resin |
| Additive: | | 2.7 g liquid digital printing ink/m$^2$ black, aqueous, applied by means of spraying |
| Carrier board: | | Board consisting of 55 wt. % melamine resin and 45 wt. % wood fibers |
| | Thickness: | 5.8 mm |
| Format: | | 2800 × 2060 mm |
| Backing: | | Sheet of paper impregnated with synthetic resin, with veneer as outer layer |
| | Paper weight: | 25 g/m$^2$ |
| | Resin application: | 600% |
| | (Top turned to the backing veneer) | |
| | Type of veneer: | Birch |
| | Thickness: | 0.8 mm |

Producing the Sheet of Paper Impregnated with Synthetic Resin

The sheet of paper is guided through an impregnation bath with liquid synthetic resin, in this case melamine resin. After impregnation, excess synthetic resin is removed by means of a scraper such that only a layer of synthetic resin sits on the upper face of the sheet of paper, which is now impregnated with synthetic resin. The upper face of the sheet of paper impregnated with synthetic resin consists of synthetic resin, in this case melamine resin. Subsequently, the additive, in this case digital printing ink, is applied in an amount of 2.7 g/m$^2$ onto the still sticky synthetic resin.

The sheet of paper impregnated in this manner is dried to a VC value of approx. 6%. The drying takes place in known drying devices, e.g. in a tunnel drier, in which hot air nozzles blast the sheet of paper from the top and bottom and thus dry same. The dried sheet of paper impregnated with synthetic resin can now be stored until it is used.

The sheet of paper impregnated with synthetic resin for the backing can be produced in the same way as described above. It can therefore be produced without or with an additive. The sheet of paper impregnated with synthetic resin for the backing is also dried to a VC value of 6%. In exemplary embodiment 5, the backing consists of the sheet of paper impregnated with synthetic resin, with or without additive, and also of a veneer, usually an inexpensive veneer that forms the outer layer on the lower face of the veneered board.

Producing the Veneered Board

The backing, sheet of paper impregnated with synthetic resin, carrier board, sheet of paper impregnated with synthetic resin and the veneer are layered in order to form a stack of materials to be pressed.

The stack of materials to be pressed is introduced into an SC press (short-cycle press), where it is pressed at a temperature of 180° C. and a pressure of p=30 N/mm$^2$ for a pressing time of 30 seconds. It can be pressed with a simple, smooth press plate. However, in this embodiment, textured press plates may also be used to provide texture. For example, a press plate with a wood texture may be used. The wood texture of the press plate was visible in the veneer. No visible layer of melamine resin had formed on the upper face of the veneer.

Subsequently, knotholes or veneer flaws (cracks etc.) were printed on the veneer at random using a digital printer. One imprint is present on at least each plank (1400×195 mm) which later is cut from the large format. The boards were then finished with a UV varnish or UV oil in the surface. The amounts applied were based on the desired use class. On the method according to the invention offers better design properties and thus use properties for a veneered board.

In general, it should be noted for the exemplary embodiments given above that the boards with the veneer surfaces can, of course, be used to produce wall or ceiling paneling. They can also be used to produce furniture.

In addition, this technology can also cover special applications in which product properties that were not achievable before with wood surfaces are required. These may be, for example, resistance to moisture, cleanability/disinfectability, scratch resistance, etc. By virtue of the method, a veneer/wood surface that has the properties of a melamine resin surface is obtained. Said surface is known for its good resistance to mechanical, chemical and thermal stresses. By controlling the flow of melamine resin, it is possible to achieve the properties of a melamine resin surface without it actually being visible. Specifically, when the melamine resin rises to the surface, the appearance of the veneer changes from wood-like, i.e. natural, to plastic-like. This effect is undesirable and is avoided here according to the invention. Some examples of possible applications include partitions in sanitary/changing areas, the vehicle sector, payment counters, outdoor furniture, etc. Of course, this list is not exhaustive and illustrates only some possible applications.

The invention claimed is:

1. A method for producing a veneered board (1), comprising a veneer (8) and a carrier board (2), said method comprising the steps of:

providing a veneer (8) and a carrier board (2),
providing a sheet of paper (4) impregnated with binder, said sheet of paper being arranged in a stack of materials to be pressed between an upper face (3) of the carrier board (2) and a lower face of the veneer (8), and
pressing the stack of materials to be pressed,
wherein
the sheet of paper (4) is impregnated with the binder,
the sheet of paper (4) impregnated with the binder is pre-dried and is sticky,
at least one additive (7) is applied onto the pre-dried, sticky binder, wherein the at least one additive is not distributed in the binder and is applied at a location on the pre-dried, sticky binder, and
the sheet of paper (4) which is impregnated with the binder and provided with the at least one additive (7) is dried to a residual moisture content of up to 8%, and wherein the at least one additive is carried through the veneer at the location during the pressing, such that the at least one additive is distributed in a targeted manner in the veneer.

2. The method according to claim 1, wherein one of the following substances or a mixture of two or more of the following substances is used as the at least one additive (7): dye, pigment, effect pigment, flame retardant, ink, UV stabilizer, infrared absorber, agents for increasing the conductivity, antibacterial agents, hydrophobizing agents, bleaching agents, or stain.

3. The method according to claim 1, wherein the at least one additive (7) is applied as a particulate solid or in liquid form.

4. The method according to claim 1, wherein the at least one additive (7) is not soluble in the binder or is not homogeneously soluble in the binder.

5. The method according to claim 1, wherein, after the sheet of paper (4) is impregnated with the binder, excess binder is removed on a lower face (5) of the sheet of paper (4), which faces the carrier board.

6. The method according to claim 1, wherein the binder is used in a first partial amount in liquid form and in a second partial amount in solid form.

* * * * *